US007963307B2

(12) United States Patent
Rudolf et al.

(10) Patent No.: US 7,963,307 B2
(45) Date of Patent: Jun. 21, 2011

(54) TIRE INFLATION SYSTEM

(75) Inventors: Markus Rudolf, Graz (AT); Axel Bernt, Graz (AT); Rene Winkler, Graz (AT); Martin Schwamberger, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 196 days.

(21) Appl. No.: 12/065,286

(22) PCT Filed: Aug. 31, 2006

(86) PCT No.: PCT/AT2006/000361

§ 371 (c)(1), (2), (4) Date: Jul. 22, 2008

(87) PCT Pub. No.: WO2007/025320

PCT Pub. Date: Mar. 8, 2007

(65) Prior Publication Data

US 2009/0032158 A1 Feb. 5, 2009

(30) Foreign Application Priority Data

Aug. 31, 2005 (AT) ................................ GM598/2005

(51) Int. Cl.
*B60C 23/10* (2006.01)

(52) U.S. Cl. ........................................................ 152/416

(58) Field of Classification Search ........... 152/415–417
See application file for complete search history.

(56) References Cited

U.S. PATENT DOCUMENTS

| | | | | |
|---|---|---|---|---|
| 4,418,737 | A * | 12/1983 | Goodell et al. | 152/416 |
| 4,619,303 | A * | 10/1986 | Bryan et al. | 152/416 |
| 6,892,776 | B2 | 5/2005 | Skoff | |
| 6,894,607 | B1 * | 5/2005 | Claussen et al. | 152/415 |
| 6,941,989 | B2 * | 9/2005 | Grotendorst et al. | 152/415 |
| 7,097,166 | B2 | 8/2006 | Folchert | |
| 2008/0251177 | A1 * | 10/2008 | Sandoni et al. | 152/416 |
| 2010/0078109 | A1 * | 4/2010 | Wilson et al. | 152/416 |

FOREIGN PATENT DOCUMENTS

| | | |
|---|---|---|
| AT | 005548 | 8/2002 |
| DE | 4009687 | 10/1991 |
| DE | 10223257 | 12/2003 |

* cited by examiner

*Primary Examiner* — Jason R Bellinger
(74) *Attorney, Agent, or Firm* — Bachman & LaPointe, P.C.

(57) ABSTRACT

A tire inflation system comprising pneumatically controlled wheel valves that are situated in the wheels of a motor vehicle. An electrically actuated pilot valve that is fixed to the vehicle controls the respective wheel valves. To produce a small, low-cost, reliable tire inflation system, a first and a second compressor are provided. The first compressor supplies a first compressed air system with medium-pressure compressed air and the second compressor supplies a second compressed air system with high-pressure compressed air. The wheel valves are situated in the first compressed air system and the pilot valves are situated in the second compressed air system.

10 Claims, 4 Drawing Sheets

TIRE INFLATION SYSTEM

BACKGROUND OF THE INVENTION

The invention relates to a tire inflation system, comprising a compressed-air generating system, a compressed-air reservoir, a valve block and pneumatically driven wheel valves in the wheels of a motor vehicle, with an electrically operated pilot control valve which is fixed to the vehicle in each case driving at least one wheel valve.

DE 40 09 687 A1 discloses a tire inflation system whose pressure generator is connected via axle valves to wheel valves which are not described in any more detail. In this case, the former control the latter by means of a pressure surge in the supply line leading to the wheel valve. Air let out from the tires is fed to the pressure generator, and from this to a pressure reservoir. This arrangement admittedly has the advantage of requiring only a single rotating transmission means into each of the wheels, although accurate and, in particular, operationally reliable, operation of the wheel valves is therefore impossible.

The system described in Austrian Utility Model AT 5548 U1 overcomes this defect at the expense of having to pass a pressure line and a control line via a rotating means for introducing them into the respective wheel. The wheel valves are pneumatically controlled valves fed from a common compressed-air source. Because the pressure in the tires is relatively low for a compressed-air system (2 to a maximum of 5 bar) and the volumes of air to be conveyed are relatively large, large valve cross sections are required. In addition, the wheel valves must be designed for the minimum system pressure of 2 bar, and their operation is uncertain with the low pressure differences that occur. In addition, high switching rates are desirable. This necessitates very large valves and actuators, which cannot be accommodated in the wheel of a motor vehicle.

DE 103 38 162 discloses a compressed-air generating system which supplies a plurality of load circuits (a compressed-air braking system and a pneumatic suspension system) with different pressure levels. The graduated pressure levels are created by means of pressure-limiting valves. However, this requires a compressor which is designed for the maximum pressure, and is therefore large, thus incurring high losses.

The object of the invention is therefore to propose a tire inflation system which is sufficiently small that it can be accommodated in a wheel and works quickly and reliably. In addition, the system is intended to be as simple and cheap as possible. This means pressure generators that are as simple as possible, short lines and, if possible, interaction with other compressed-air loads.

SUMMARY OF THE INVENTION

The foregoing object is obtained by providing a compressed-air generating system which has a first compressor and a second compressor, the first compressor provides compressed air at a medium pressure level to a first compressed-air system and the second compressor provides compressed air at a high pressure level to a second compressed-air system, with the wheel valves being connected to the first compressed-air system, and the pilot control valves being connected to the second compressed-air system. Since the pilot control valves are operated at a high and largely constant pressure level, the actuators for the wheel valves are small and operate reliably and quickly. They require only a very small amount of compressed air. The use of two compressors allows them to be designed specifically for the requirements and economically; the first compressor for the lower pressure level and higher feed rates, and the second compressor for the higher pressure level and lower feed rates. Because of the reservoir, the compressors also do not need to be designed for load peaks.

In a development of the invention, the second compressed-air system also supplies other loads, in particular pneumatic suspension bellows for pneumatic wheel suspension or level control. This results in better utilization of the second compressor, with pneumatic wheel suspension and the tire inflation system complementing one another well because of the low feed rates. In this case, at least one of the pneumatic suspension bellows can also be used as a pressure reservoir.

The induction side of the first compressor preferably is or can be connected to the surrounding area, and its pressure side is connected via a first non-return valve to a pressure reservoir, and the second compressor can be connected both to the first compressed-air system and to the second compressed-air system. The first compressor therefore has to feed only when the pressure reservoir is empty, and the second can carry out various functions. For this purpose, it can be connected by line in various ways to the two systems.

In a first advantageous embodiment, the induction side of the second compressor has a first valve, and its pressure side has a second valve and two bypass lines, with the first valve making the connection to the first compressed-air system, and the second valve making the connection to the second compressed-air system. Its suction side can be selectively connected via the first valve either to the first compressed-air system or via a bypass line, and the second valve can be connected to the second compressed-air system. In the latter case, air flowing back from the high-pressure system (the pneumatic suspension) is fed into the pressure reservoir. From its pressure side, the second compressor can selectively either feed the second compressed-air system via the second valve, or can feed the first compressed-air system via the second bypass line and the first valve. Furthermore, the first compressed-air system and the second compressed-air system can be connected to one another via a third valve.

In a second advantageous embodiment, both the induction side and the pressure side of the second compressor can be connected via a second valve to the second compressed-air system, with the induction side also being connected via a second non-return valve to the first compressed-air system, and with the non-return valve opening for flow toward the compressor. In this case, the second valve is a so-called 4/2 valve (4 connections and two positions). This arrangement also allows feeding to the first or second compressed-air system and reception of compressed air flowing back from the second compressed-air system.

In order to allow compressed air flowing back from the first compressed-air system to be supplied to the pressure reservoir as well, a fourth solenoid valve and possibly (if the air pressure for the front wheels and for the rear wheels is intended to be controlled independently of one another) a fifth solenoid valve are provided in the first compressed-air system, which solenoid valve releases the path to the wheel valve(s) in its first position or, in its second position, supplies air flowing back therefrom via at least a third non-return valve for further use. This may be the regeneration of an air dryer. Because the return flow from the tire inflation system (when the tire pressure is reduced) once again involves a relatively large volume flow at a relatively low pressure, it is advantageous to operate the fourth and if appropriate fifth solenoid valves pneumatically, for which purpose a sixth valve is operated as a pilot control valve with compressed air from the second compressed-air system (higher pressure).

It is also within the scope of the invention for the control valves of the pneumatic suspension system and the electrically operated pilot control valves, which are fixed to the vehicle, for the wheel valves to be arranged in the vicinity of the wheels, so that the second compressed-air system has to feed only one (high-pressure) compressed-air line to each wheel. As a continuation of this idea, the electrically operated pilot control valves can be connected for flow purposes to the respective pneumatic suspension bellows such that they take the control air for the wheel valves therefrom. This results in a minimum number of compressed-air lines having to be installed in the vehicle.

BRIEF DESCRIPTION OF THE DRAWINGS

The invention will be described and explained in the following text with reference to figures, in which.

DETAILED DESCRIPTION

Figure 1:
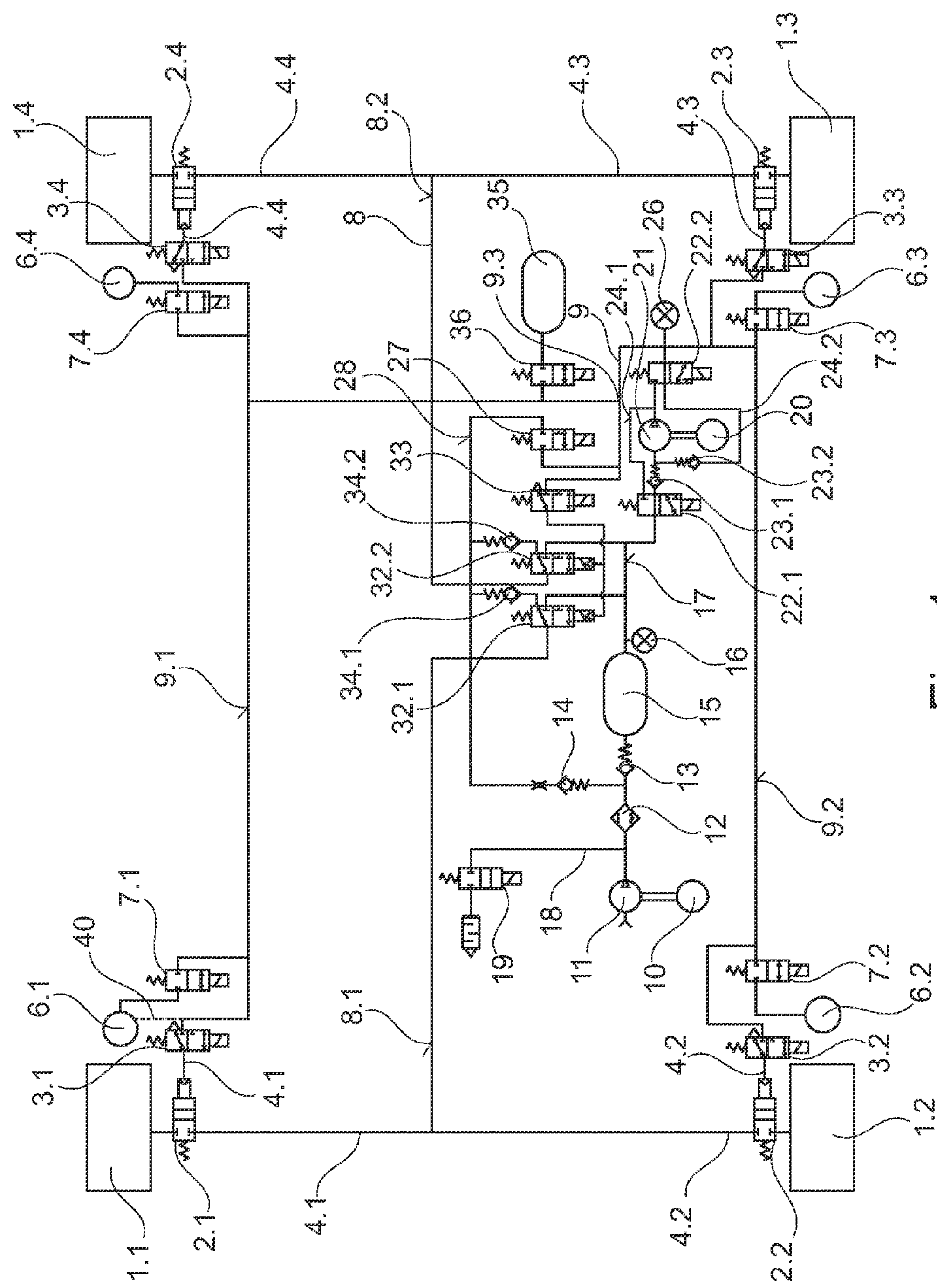
FIG. 1 shows a schematic diagram of a first embodiment of a system according to the invention.

In FIG. 1, the wheels of a motor vehicle are annotated 1.1 to 1.4, wheel valves fitted to or in them are annotated 2.1 to 2.4, and associated pilot control valves are annotated 3.1 to 3.4. Wheel valves 2.1 to 2.4 and pilot control valves 3.1 to 3.4 are part of a tire inflation system. Pneumatic suspension bellows 6.1 to 6.4 and pneumatic suspension valves 7.1 to 7.4 are part of a pneumatic suspension system or a pneumatic level control system. The tire inflation system and pneumatic suspension system are connected to two compressed-air systems at different pressure levels.

The first compressed-air system produces a pressure of between 2 and 5 bar in the lines 8.1 and 8.2, which is passed via two-channel rotating introduction means 4.1 to 4.4 and the wheel valves 2.1 to 2.4 providing inflation air to the wheels, to be more precise to their tires. The second compressed-air system is at a pressure of, for example, 16 to 20 bar and comprises a pressure line 9, supplying the pilot control valves 3.1 to 3.4 and the pneumatic suspension valves 7.1 to 7.4 via lines 9, 9.1, 9.2 and the branches 9.3. The pilot control valves 3.1 to 3.4 control air from the lines 9.1, 9.2, via the same two-channel rotating introduction means 4.1 to 4.2 to the pneumatically controlled wheel valves 2.1 to 2.4.

The valve which are not operated pneumatically are controlled by means of electrical signals; the associated control center and the control lines leading to the valves are not shown. A dashed line 40 in FIG. 1 also indicates that the control air can be supplied at a high pressure level to the pilot control valve 3.1 from the pneumatic suspension bellows 6.1 as well.

A first compressor 11, which is driven by an electric motor 10, and a second compressor 21, which is driven by an electric motor 20, are provided in order to supply the two compressed-air systems. The compressors are preferably piston-type compressors with internal non-return valves that are not illustrated; their feed direction is indicated by a small triangle in the figures. The first compressor 11 is in the form of a low-pressure compressor and its induction side is connected to the atmosphere. Its pressure side passes via an air dryer 12 and a first non-return valve 13 to a pressure reservoir 15 and from there to a line 17, which is fitted with a pressure sensor 16 and is itself part of the first compressed-air system. The pressure side of the first compressor 11 can be connected via a line 18 with a shut-off valve 19 to the atmosphere.

The second compressor 21 is designed such that it provides a feed with optimum efficiency from the pressure level of the first compressed-air system to the compressed-air level of the second compressed-air system which, however, can also cover different pressure ranges, although with sub-optimum efficiency. For this purpose, it is connected in a particular manner to the first compressed-air system 8 and to the second compressed-air system 9. There is a first valve 22.1 on the induction side of the second compressor 21 and a second valve 22.2 on its pressure side, as well as a third and a fourth non-return valve 23.1, 23.2 and a first and second bypass line 24.1 and 24.2. In this case, the two valves 21.1 and 21.2 are so-called three/two-way valves (3/2 valves) which connect three connections to one another in two different ways.

The first valve 22.1 connects the line 17 that belongs to the first compressed-air system selectively either via the non-return valve 23.1 to the induction side of the second compressor 21 or via the first bypass line 24.1 to its pressure side. The first bypass line 24.1 allows compressed air that has been let out of the second compressed-air system 9 to be fed back into the line 17 of the first compressed-air system. The second valve 22.2 connects the second compressed-air system 9 selectively either to the pressure side of the second compressor 21 or to the second bypass line 24.2, which makes the connection to the induction side of the second compressor 21 via a fourth non-return valve 23.2, so that compressed air which has been let out of the second compressed-air system 9 is compressed again and can be supplied via the first bypass line 24.2 and the first valve 22.1 to the line 17 of the first compressed-air system.

The second compressed-air system 9 is therefore connected to the second valve 22.2 on the opposite side to the compressor 21, and the pressure there is measured by a second pressure sensor 26. The line 9, which belongs to the second compressed-air system, can be connected via a third valve 27, a connecting line 28, the second non-return valve 14 and the first non-return valve 13 to the pressure reservoir 15. Furthermore, the second compressed-air system 9 feeds a sixth valve 33, which acts as a pilot control valve for a fourth and a fifth valve 32.1 and 32.2. The two latter valves are therefore operated pneumatically and selectively make the connection between the first compressed-air system 8.1, 8.2 and either the line 17 leading to the pressure reservoir 15 or via fifth and sixth non-return valves 34.1, 34.2 to the connecting line 28 and thus to the pressure reservoir 15. A further high-pressure reservoir 35, which is accessible via a further valve 36, can be provided in the second compressed-air system 9.1.

Figure 2:
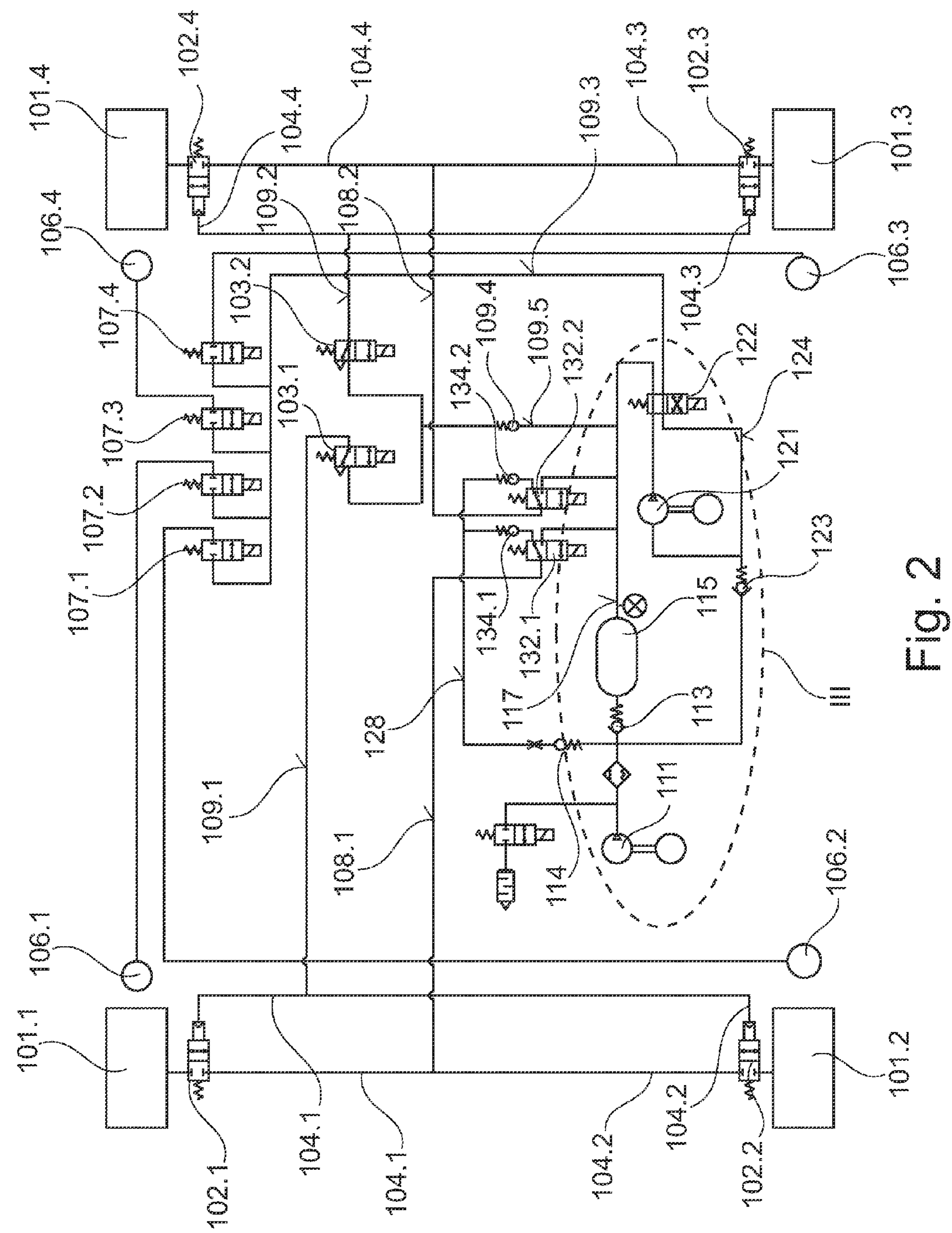
FIG. 2 shows a schematic diagram of a second embodiment of a system according to the invention.

In the embodiment shown in FIG. 2, analogous elements have reference symbols increased by 100. The numbers following the decimal point are omitted if possible. Wheels 101.1 to 101.4, wheel valves 102.1 to 102.4 and rotating introduction means 104.1 to 104.2 are the same as in FIG. 1 for all four wheels. The first compressed-air system is in this case formed by the lines 108.1 and 108.2, and the second compressed-air system is formed by the lines 109.1 and 109.2, in which the pilot control valves 103.1 and 103.2 are arranged. The second compressed-air system also includes the supply line 109.5 with the non-return valve 109.4 to the two pilot control valves 103.1 and 103.2, as well as a separate line 109.3, which leads to the pneumatic suspension valves 107.1 to 107.4 and also to the pneumatic suspension bellows 106.1 to 106.4.

Once again, two compressors 111, 121 are provided in order to produce the compressed air for the two compressed-air systems. As in FIG. 1, the first compressor feeds a pressure reservoir 115 and a line 117, which is itself part of the first compressed-air system and is connected via a fourth and fifth valve 132.1, 132.2 to the lines 108.1, 108.2. The valves 132.1, 132.2 selectively make the connection between the lines 108.1, 108.2 of the first compressed-air system and either the line 117 or, via non-return valves 134.1, 134.2 of a connecting line 128 via a second non-return valve 114 and a first non-return valve 113 to the pressure reservoir 115.

In this case, the second compressor 121 can be connected via a first valve 122 both to the lines 109.3 and 109.5 in the second compressed-air system and to the line 117 in the first compressed-air system. This valve 122 is a valve with 4 connections and two positions (a 4/2 valve). Furthermore, a bypass line 124 is provided, having a non-return valve 123 and connecting the first valve 122 to the pressure reservoir 115. The particularly simple inclusion of the second compressor 121 in FIG. 2 nevertheless unexpectedly offers a large number of options for the widely differing range of operating states.

Figure 3:
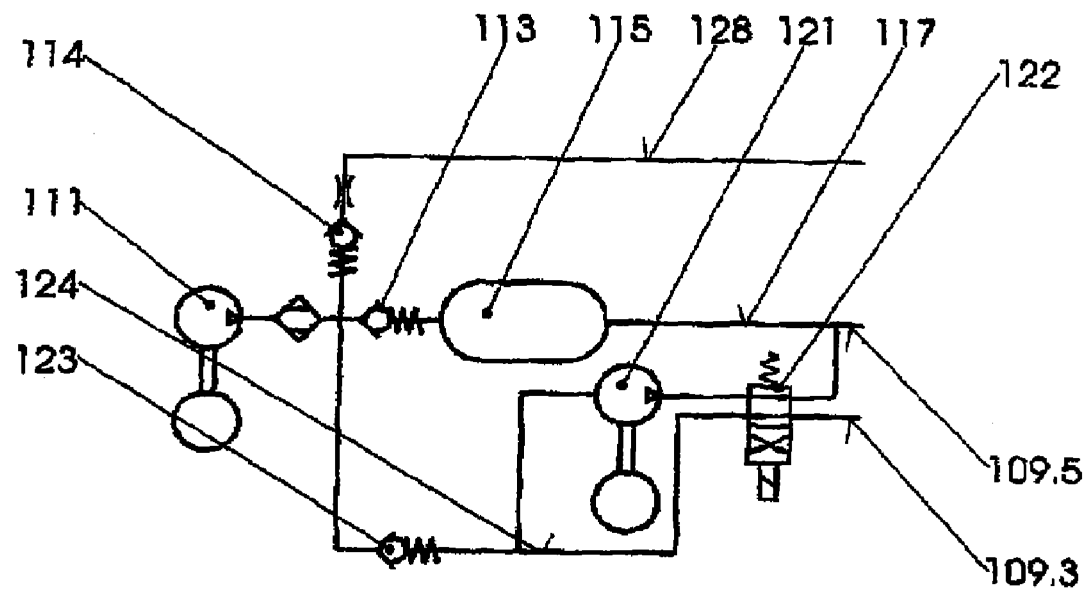
FIG. 3 shows detail III in FIG. 2, in a first position.

In FIG. 3, the pressure reservoir 115 is replenished without any action on the tire inflation or pneumatic suspension. For this purpose, the first compressor 111 is switched on first of all, followed by the second compressor 121, so that both compressors 111, 121 then replenish the pressure reservoir in parallel; to be precise the first compressor 111 via the non-return valve 113 and the second compressor 121 via the non-return valve 123 and the first valve 122 in the position shown, and then via the line 117. When a specific pressure level is reached in the pressure reservoir 115, the non-return valve 113 is closed and the second compressor 121 increases the pressure level in the pressure reservoir 115 further by further compressing the air, which has been initially compressed by the compressor 111, via the non-return valve 123. The two-stage compression process thus produced results in a feed performance with better efficiency, allowing a higher final pressure to be achieved in the pressure reservoir 115.

Figure 4:
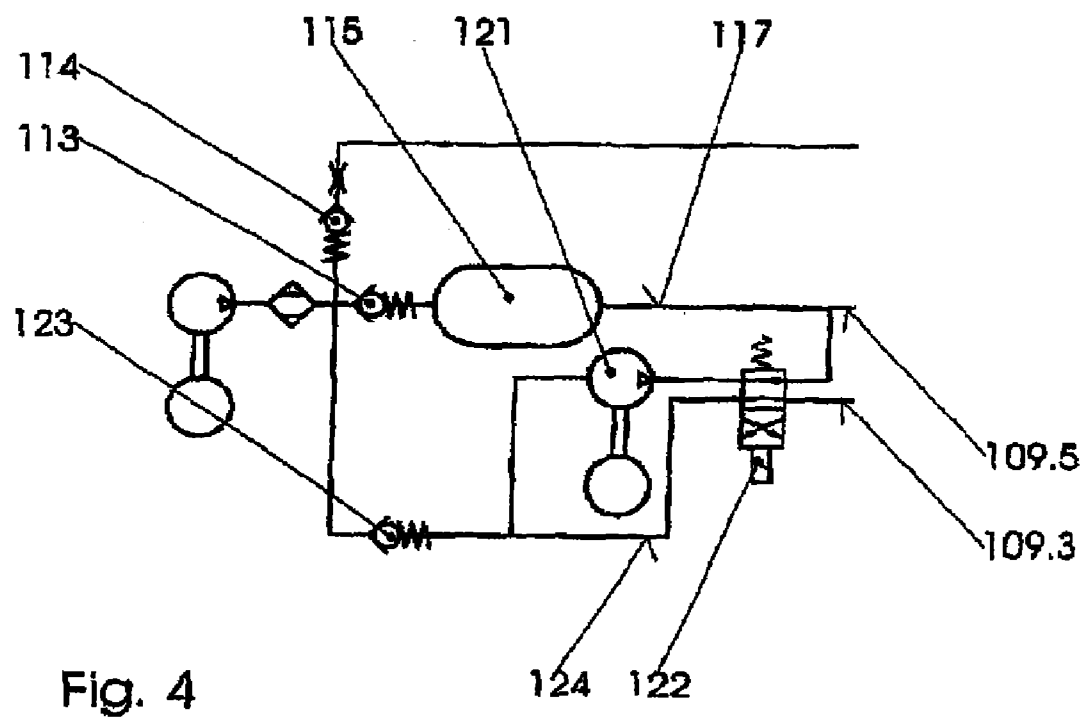
FIG. 4 shows detail III in FIG. 2, in a second position.

If the pressure level in the pneumatic suspension bellows is reduced as shown in FIG. 4, the air flows from these bellows via the line 109.3, the valve 122, the bypass line 124, the second compressor 121 and the line 117 into the pressure reservoir 115. During this process, the two non-return valves 113, 123 are closed. The recompression of air from the pneumatic suspension bellows results in a significant improvement in efficiency and allows the pressure in the pressure reservoir 115 to be raised to a higher level.

Figure 5:
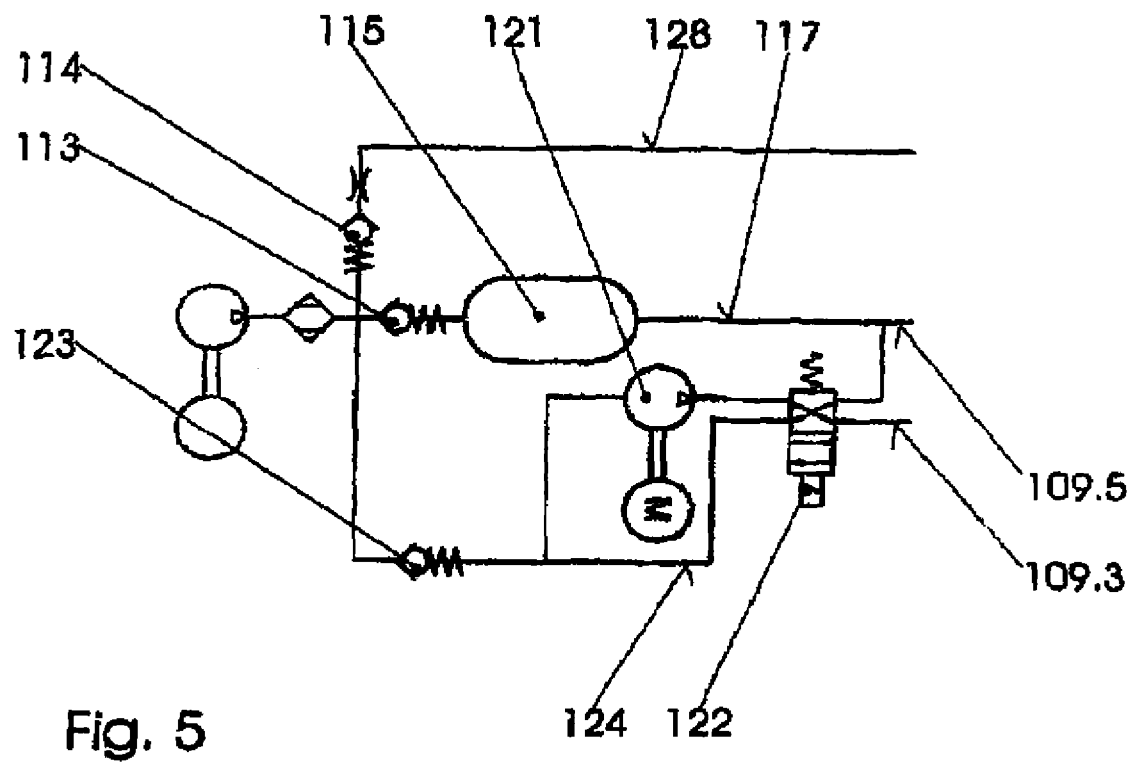
FIG. 5 shows detail III in FIG. 2, in a third position.

In FIG. 5, the motor vehicle has been raised by inflating the pneumatic suspension bellows. For this purpose, compressed air is passed from the pressure reservoir 115 via the valve 122, whose position has now been reversed, and the bypass line 124 to the second compressor 121 and from there to the pressure line 109.3, which is part of the second compressed-air system and leads to the pneumatic suspension valves.

Figure 6:
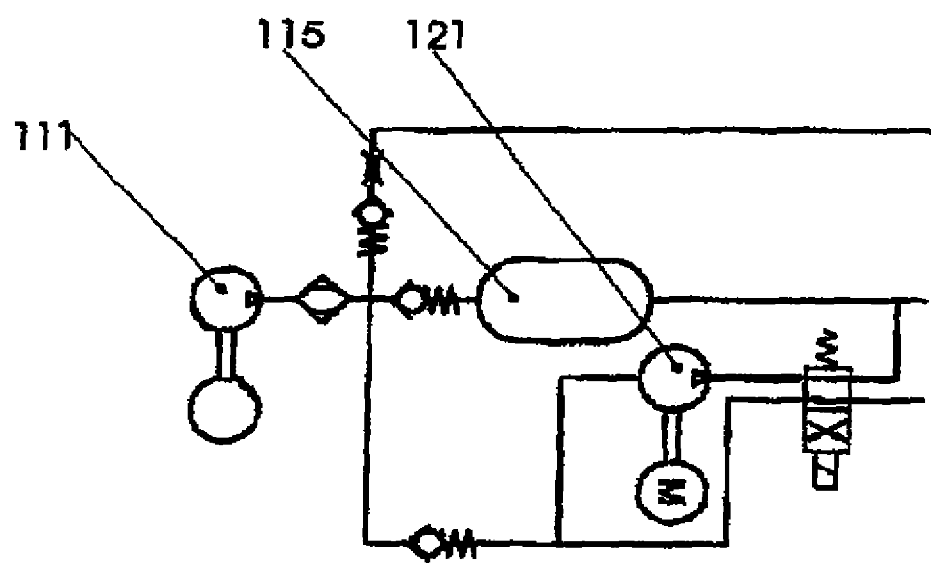
FIG. 6 shows detail III in FIG. 2, in a fourth position.

As shown in FIG. 6, the two compressors 111, 121 can each carry out the function of the other, after a fashion, in the event of a defect. If the first compressor 111 is defective, the second compressor 121 can suck in air through the compressor 111 and can pass compressed air to the second compressed-air system 109. If the second compressor 121 is defective, the first compressor 111 can still replenish the pressure reservoir 115, even if only very slowly.

The invention claimed is:

1. A tire inflation system, comprising a compressed-air generating system, a compressed-air reservoir, a valve block and pneumatically driven wheel valves in the wheels of a motor vehicle, with electrically operated pilot control valves which are fixed to the vehicle each driving at least one wheel valve, the compressed-air generating system has a first compressor and a second compressor, the first compressor makes compressed air available to a first compressed-air system designed to receive compressed air at a first pressure level, and the second compressor makes compressed air available to a second compressed-air system designed to receive compressed air at a second-pressure level higher than the first pressure level, wherein the wheel valves are arranged in the first compressed-air system, and the pilot control valves are arranged in the second compressed-air system, and the second compressed-air system also supplies, in addition to the tire inflation system, air to a plurality of pneumatic suspension bellows for pneumatic wheel suspension or level control.

2. The tire inflation system as claimed in claim 1, wherein at least one of the plurality of pneumatic suspension bellows is used as a pressure reservoir.

3. The tire inflation system as claimed in claim 1, wherein the first compressor sucks air in from the surrounding area and the first compressor pressure side is connected via a first non-return valve to a pressure reservoir, and wherein the second compressor is connected both to the first compressed-air system and to the second compressed-air system.

4. The tire inflation system as claimed in claim 3, wherein an induction side of the second compressor has a first valve, and the second compressor pressure side has a second valve and two bypass lines, wherein the first valve connects to the first compressed-air system, and the second valve connects to the second compressed-air system.

5. The tire inflation system as claimed in claim 1, wherein the first compressed-air system and the second compressed-air system are connected to one another via a third valve.

6. The tire inflation system as claimed in claim 3, wherein both an induction side and a pressure side of the second compressor is connected via a second valve to the second compressed-air system, wherein the induction side is connected via a non-return valve to the first compressed-air system, and the non-return valve opens for flow toward the compressor.

7. The tire inflation system as claimed in claim 1, wherein a fourth solenoid valve and a fifth solenoid valve are provided in the first compressed-air system, wherein the solenoid valves release the path to the wheel valves in a first position and in a second position, supplies air flowing back therefrom via a non-return valve for further use.

8. The tire inflation system as claimed in claim 7, wherein the fourth and fifth solenoid valves are operated pneumatically by a sixth valve is operated as a pilot control valve with compressed air from the second compressed-air system.

9. The tire inflation system as claimed in claim 1, wherein control valves of the pneumatic suspension bellows and electrically operated pilot control valves which are fixed to the vehicle for the wheel valves are arranged in the vicinity of the wheels.

10. The tire inflation system as claimed in claim 9, wherein the electrically operated pilot control valves are connected for flow purposes to the respective pneumatic suspension bellows such that the electrically operated pilot control valves remove the control air for the wheel valves therefrom.

* * * * *